US007654608B2

(12) United States Patent
Krajenke et al.

(10) Patent No.: US 7,654,608 B2
(45) Date of Patent: Feb. 2, 2010

(54) EXTENDED-TRAVEL SLIDING DOOR WITH ARTICULATING ROLLER BRACKET

(75) Inventors: Gary W. Krajenke, Warren, MI (US); Richard J. Lange, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 73 days.

(21) Appl. No.: 12/045,726

(22) Filed: Mar. 11, 2008

(65) Prior Publication Data

US 2009/0230722 A1 Sep. 17, 2009

(51) Int. Cl.
*B60J 5/06* (2006.01)

(52) U.S. Cl. ............................ 296/155; 49/405; 49/450

(58) Field of Classification Search ................. 296/155; 49/405, 449, 450

See application file for complete search history.

(56) References Cited

U.S. PATENT DOCUMENTS 4,152,872 A 5/1979 Tanizaki et al.
4,502,246 A * 3/1985 Minami ........................ 49/322
5,481,830 A * 1/1996 Gooding et al. ............... 49/449
6,036,257 A 3/2000 Manuel
6,286,260 B1 * 9/2001 Grabowski ................... 49/216

FOREIGN PATENT DOCUMENTS

JP 63214463 * 3/1990

* cited by examiner

*Primary Examiner*—Dennis H Pedder

(57) ABSTRACT

A sliding door for a vehicle has a door bracket. A track is mounted along the vehicle and extends to a remote end. A roller bracket is movable between a first position proximate the opening and a second position at the end of the track. The roller bracket includes an articulating arm retained by the roller bracket by a first pivot and pivotally retained at a second end by the door bracket. The articulating arm has a first orientation for rotationally positioning the sliding door toward the closed position and a second orientation for rotationally positioning the sliding door into the open position. Movement of the roller bearing into the second position results in the articulating arm moving from the first to the second orientation. An over-center spring mechanism may maintain the positioning of the roller bracket relative to the sliding door throughout the travel of the bracket.

13 Claims, 11 Drawing Sheets

EXTENDED-TRAVEL SLIDING DOOR WITH ARTICULATING ROLLER BRACKET

BACKGROUND OF INVENTION

The present invention relates generally to vehicular sliding doors in which the rearward side of the sliding door is supported by a roller bracket that traverses a roller track mounted along the exterior side of the vehicle.

A typical sliding door for a passenger vehicle such as a van, minivan, or a crossover vehicle is supported by and guided by upper and lower track assemblies at the front edge of the sliding door and a center track assembly attached to the rear edge of the door.

The size of the door opening that may be uncovered when the sliding door opens is limited to the available distance of rearward travel for the door. A large door opening is desired for ease of ingress/egress and for maximizing the size of loads that may pass through the door opening. However, door travel is typically limited by the length of the tracks in which the track assemblies traverse during opening of the sliding door. The center track, which receives a roller bracket mounted to the rearward edge of the sliding door, cannot extend beyond the back edge of the vehicle body. The presence of rear taillight assemblies may further limit the available space for the center track. In addition, it is desired to minimize the length of the track to reduce its visibility for aesthetic purposes.

SUMMARY OF INVENTION

In order to extend the travel of the sliding door beyond the position that would otherwise result when the roller bracket reaches the end of the roller track, an articulating arm is used to join the roller bracket to the door. By pivoting the articulating arm when the roller bracket is at its most open position, additional opening movement of the sliding door is obtained.

In one aspect of the invention, an apparatus is provided for supporting a sliding door that moves between a closed position and a fully open position to selectively cover an opening in a vehicle. A door bracket is fixedly mounted to the sliding door. A track is mounted along an exterior side of the vehicle and extends away from the opening to a remote end. The length of the track from the opening to the remote end is less than the distance traveled by the sliding door between the closed position and the fully open position. A roller bracket having rollers received by the track is movable between a first position proximate the opening and a second position at the remote end of the track. The roller bracket includes an articulating arm pivotally retained by the roller bracket at a first end of the articulating arm by a first pivot and pivotally retained at a second end by the door bracket. The articulating arm has a first orientation for rotationally positioning the sliding door toward its closed position and a second orientation for rotationally positioning the sliding door away from its closed position and into the fully open position. Movement of the roller bearing into its second position results in the articulating arm moving from its first orientation to its second orientation. An over-center spring mechanism can be included for controlling and maintaining the positioning of the roller bracket relative to the sliding door throughout the full travel of the roller bracket.

The invention has the advantage of providing a length of sliding door travel which is greater than the length of the roller track. As a result, larger openings can be provided while avoiding the space constraints and styling problems associated with a long roller track.

DETAILED DESCRIPTION

Figure 1:
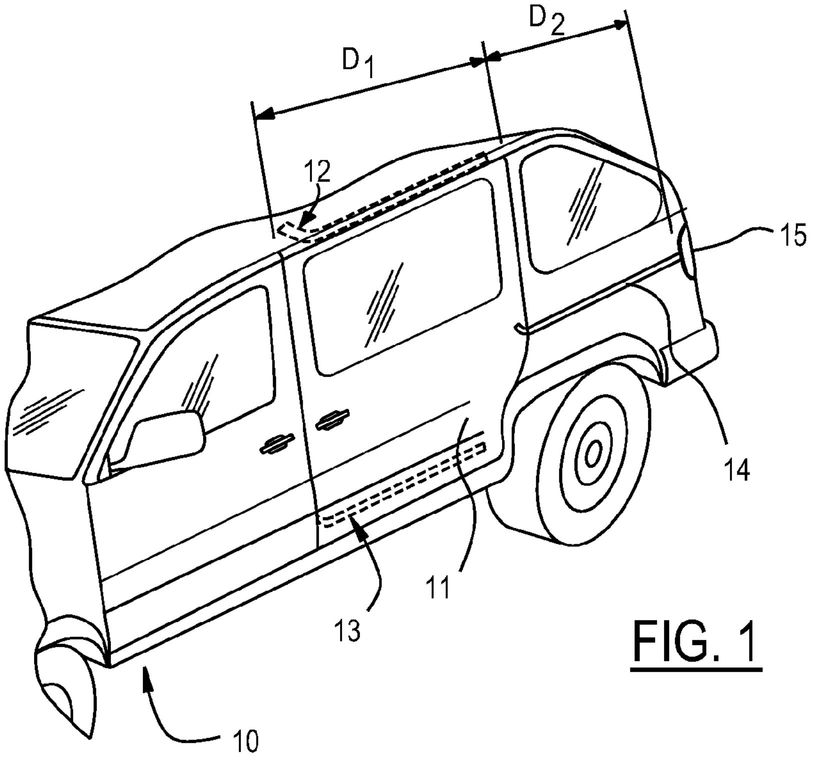
FIG. 1 is a perspective view showing a vehicle and a sliding door in the closed position.

Referring now to FIG. 1, a vehicle 10 has a sliding door 11 supported along an upper roller track 12, a lower roller track 13, and a center roller track 14. Respective roller brackets (not shown) slidable in each track are joined to respective door brackets (not shown) on the interior side of sliding door 11. In a conventional system, a pair of brackets at the top and bottom of the forward edge of sliding door 11 are joined to the roller brackets sliding in tracks 12 and 13, respectively. A door bracket attached at the center rear edge of sliding door 11 is coupled to a roller bracket slidably received in track 14. The tracks have initial portions which move radially outward so that the door first moves outward from the vehicle body in order to clear the vehicle body and then slides toward the rear of vehicle 10. Because of this compound movement, each roller bracket is pivotally connected to its respective door bracket.

Sliding door 11 and the opening in vehicle 10 which receives sliding door 11 each have a front-to-back width designated $D_1$. For conventional sliding doors, the rearward movement of sliding door 11 has a maximum distance designated $D_2$ which is the length of center track 14 from the edge of the door opening to the end of track 14. The space available for track 14 is limited by the overall length of vehicle 10, and may be even more limited by the presence of other structures such as a taillight 15. If distance $D_2$ is less than distance $D_1$, then when a conventional sliding door 11 is at its maximum rearward travel position it continues to block a portion of the door opening. It would be desirable to obtain an extension of the sliding door travel without increasing the length of the corresponding center track.

Figure 2:
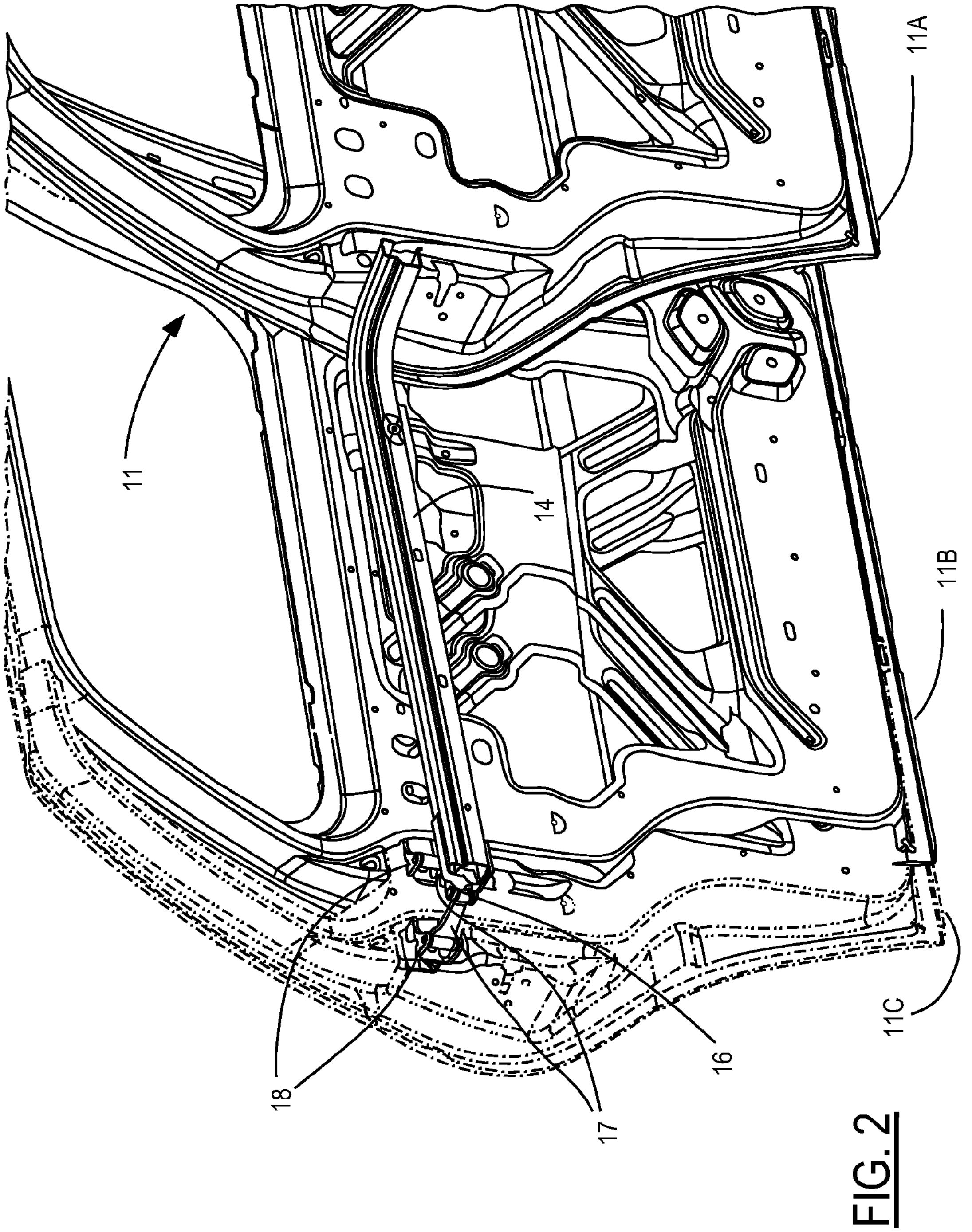
FIG. 2 is an interior side view showing a sliding door at various positions within the track, and translation of the articulating arm of the present invention when the roller bracket is at the end of the track.

FIG. 2 is an interior side view of the present invention showing door 11 at several positions. Three different locations of door 11 are obtained with just two different locations of the roller bracket. At location 11A, door 11 is at a radially inward position to be flush with the vehicle exterior surface while in its closed position. At position 11B, door 11 has traveled in a rearward direction until a roller bracket 16 has reached the end of track 14. An articulating arm 17 connects the roller bracket to a door bracket 18. Arm 17 is pivotal on roller bracket 16 under the conditions that roller bracket 16 is at when at the end of the track, so that it may be pivoted into a position shown at 11C wherein the rear edge of door 11 continues moving rearward as a result of the pivoting of arm 17. Thus, even though roller bracket 16 can move no farther, door 11 continues to open (typically with a small amount of additional radial movement away from the exterior side of the vehicle) provided that the upper and lower roller brackets and tracks (not shown) can accommodate the additional distance.

Figure 3:
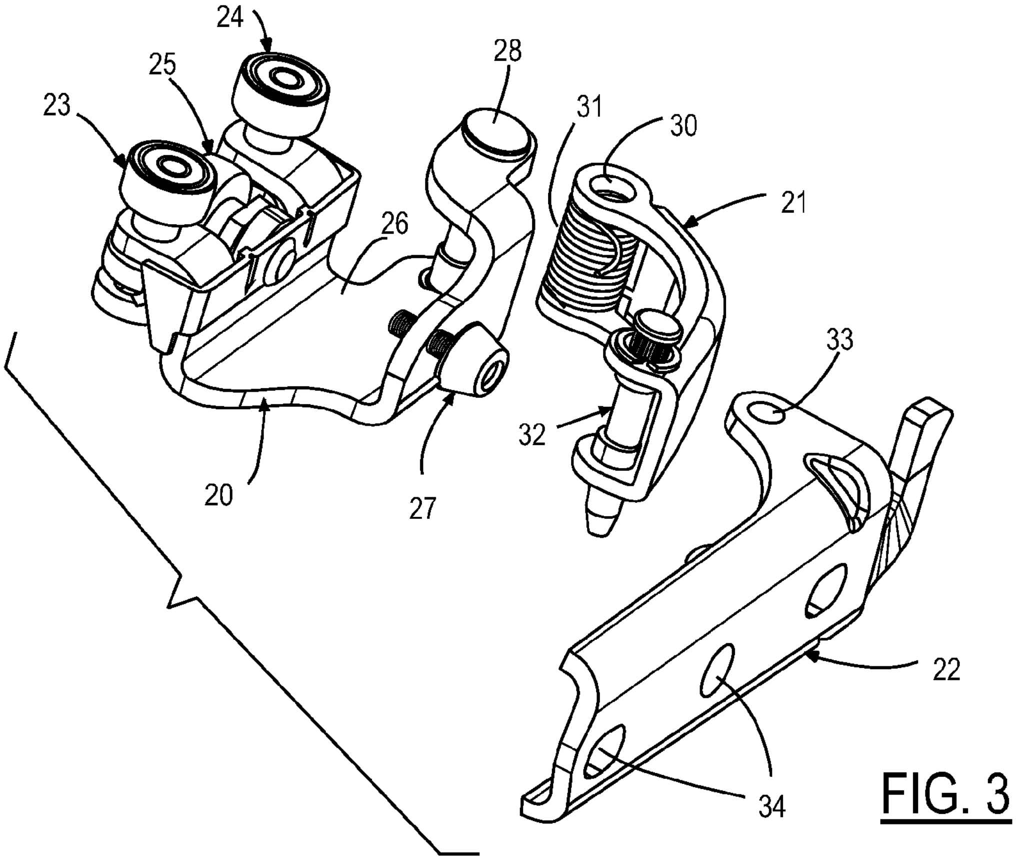
FIG. 3 is an exploded view showing a first embodiment of the roller bracket and the door bracket.
Figure 4:
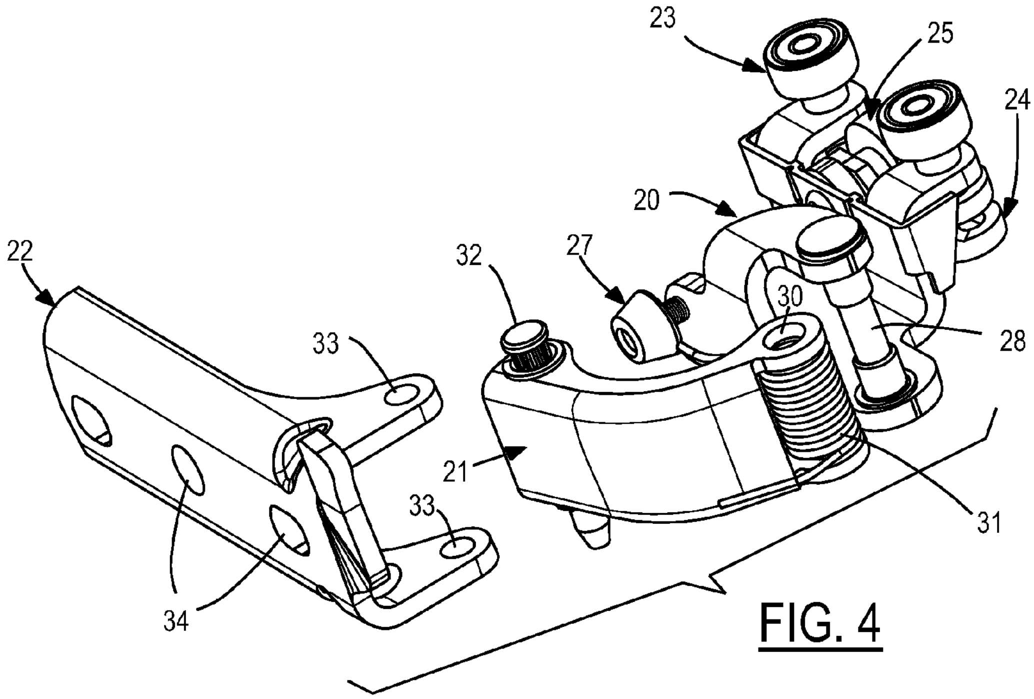
FIG. 4 is a different exploded view of the brackets of FIG. 3.
Figure 5:
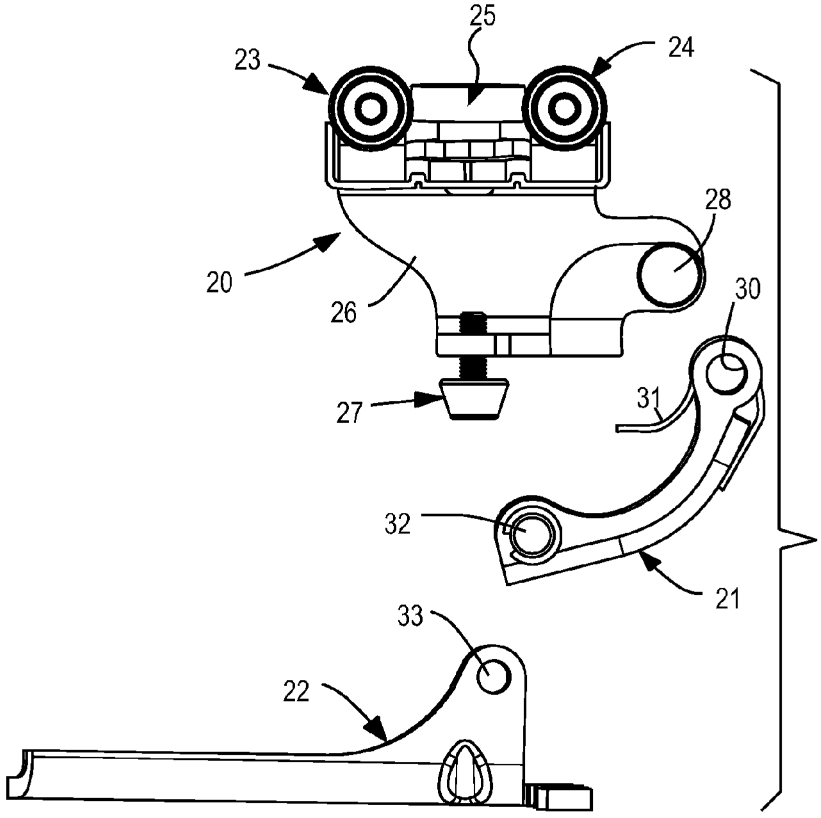
FIG. 5 is a top view of the components of FIG. 3.

Referring to FIGS. 3-5, a first embodiment of a roller assembly for the center track includes a roller bracket 20 with an articulating arm 21 for coupling to a door bracket 22. Roller bracket 20 includes sets of roller wheels 23-25 to be received in the roller track as is known in the art. A bracket body 26 receives an adjustable bumper stop 27 and a pivot pin 28. Articulating arm 21 includes a set of aligned holes 30 and a spring 31 for likewise capturing pivot pin 28. A second pivot pin 32 is rotationally mounted to the opposite end of articulating arm 21 and is captured by parallel pivot holes 33 on door bracket 22. Door bracket 22 includes a plurality of mounting holes 34 for mounting door bracket 22 to the inside of the sliding door.

Figure 7:
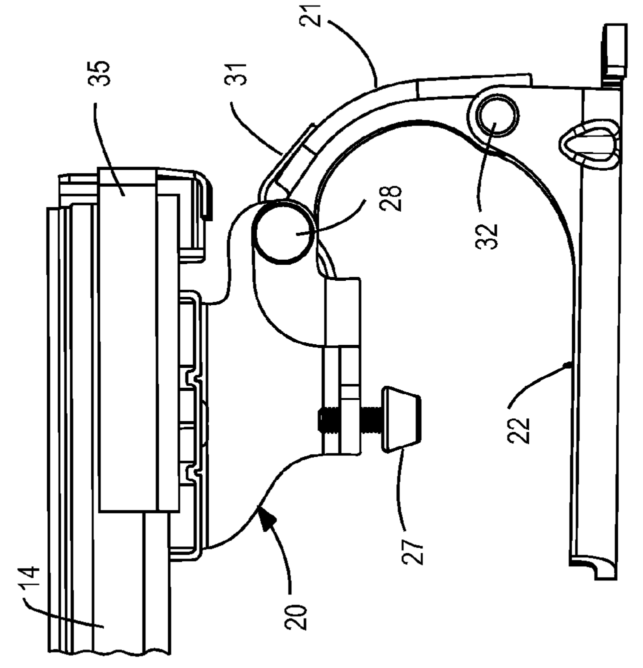
FIG. 7 is a top view showing the assembly of FIG. 6 with the articulating arm moved to its second orientation.
Figure 6:
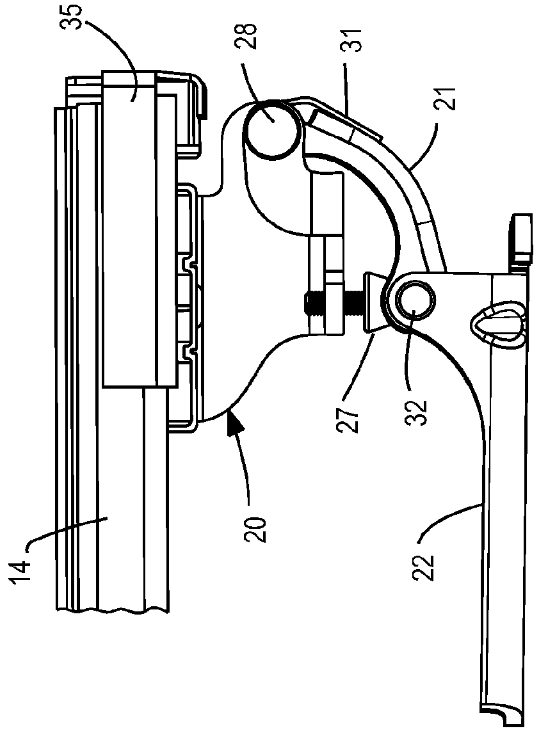
FIG. 6 is a top view showing the roller assembly of FIG. 3 in a first orientation.
Figure 8:
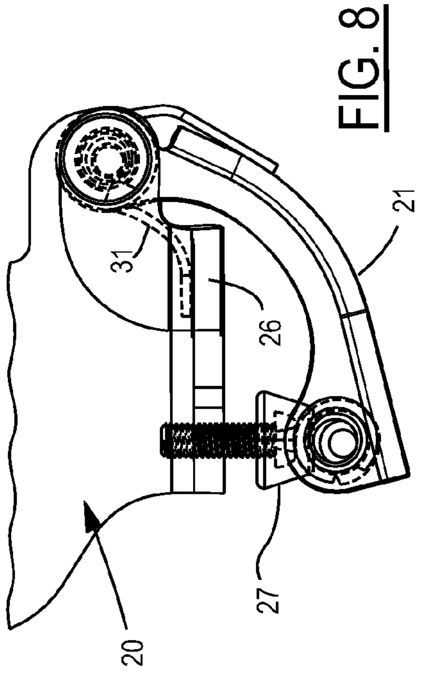
FIG. 8 is a top view showing a bumper stop contacting the articulating arm in the first orientation.

FIG. 6 shows roller bracket 20 having reached an end of travel in track 14. An end cap 35 may be provided for stopping the travel of roller bracket 20. Articulating arm 21 is shown in a first orientation comprising a non-extended position wherein spring 31 retains articulating arm 21 in a closed position against bumper stop 27. Based on the inertia of the moving door and any additional manual pulling forces from a person opening the sliding door, articulating arm 21 moves into a second orientation comprised of an extended position wherein door bracket 22 shifts toward the rear of the vehicle with respect to the end of track 14 as shown in FIG. 7. In order to maintain the sliding door at the extended position, a separate catch mechanism (not shown) is provided for maintaining the extended position once it is reached. For example, a conventional mechanism is known for securing the sliding door in its maximum open position once reached, until the door handle is pulled. Pulling of the handle releases the catch mechanism and allows the sliding door to be closed. Once the catch mechanism is released, spring 31 returns articulating arm 21 to its first orientation as shown in FIG. 8 where the articulating arm 21 is held against adjustable bumper stop 27.

Figure 9:
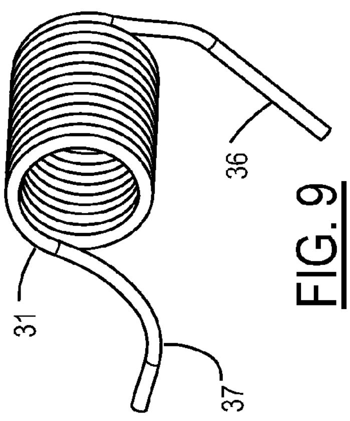
FIG. 9 is a perspective view of the spring of FIG. 8.
Figure 10:
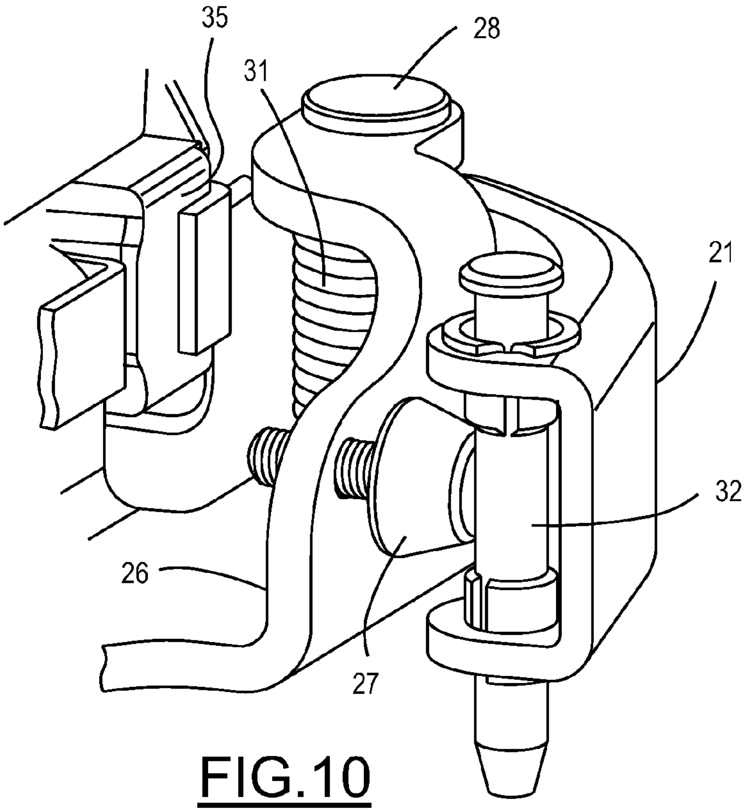
FIGS. 10 and 11 are side views showing the bumper stop contacting the articulating arm.
Figure 11:
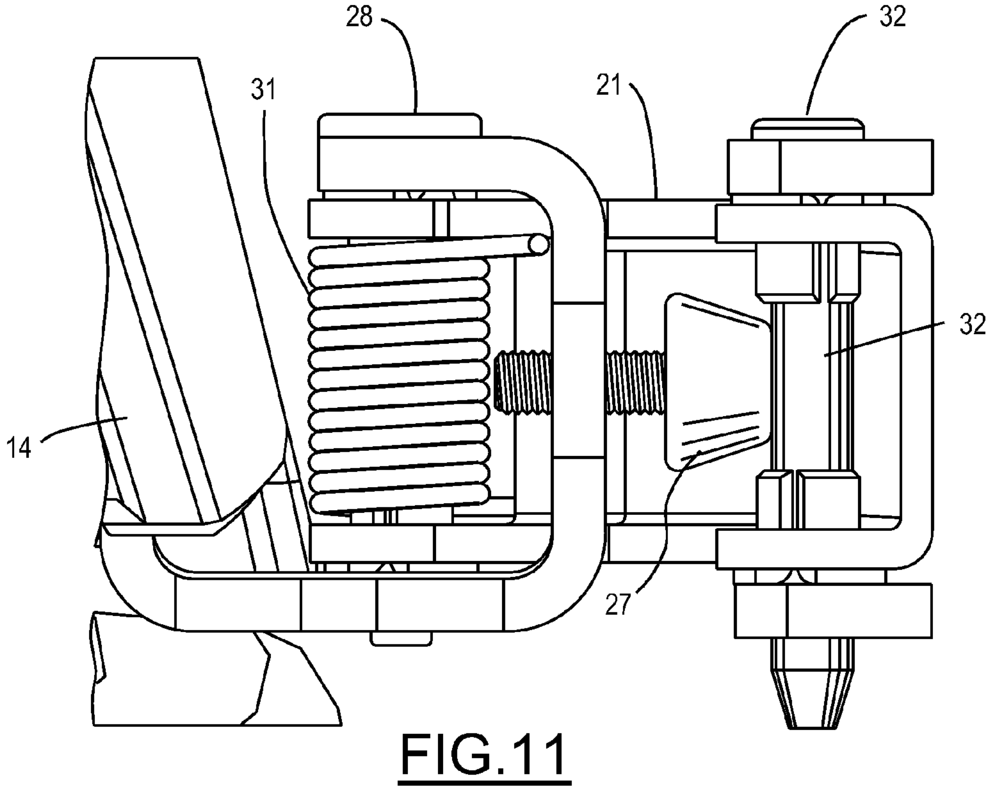

As shown in FIG. 9, spring 31 has a pair of legs 37 and 38 for compressing articulating arm 21 toward bumper stop 27. FIGS. 10 and 11 provide additional views showing pivot pin 32 of articulating arm 21 being retained against bumper stop 27 during the sliding (during either opening or closing) of the sliding door.

Figure 12:
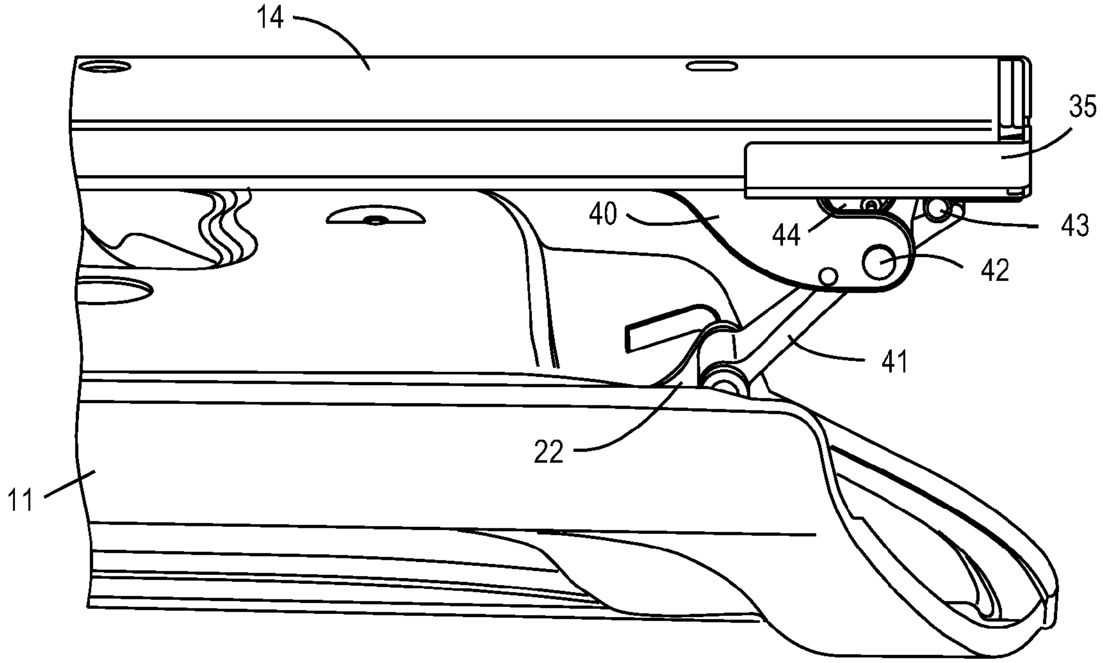
FIG. 12 is a top view of another embodiment of an articulating arm just before the roller bracket reaches the end of the track.
Figure 13:
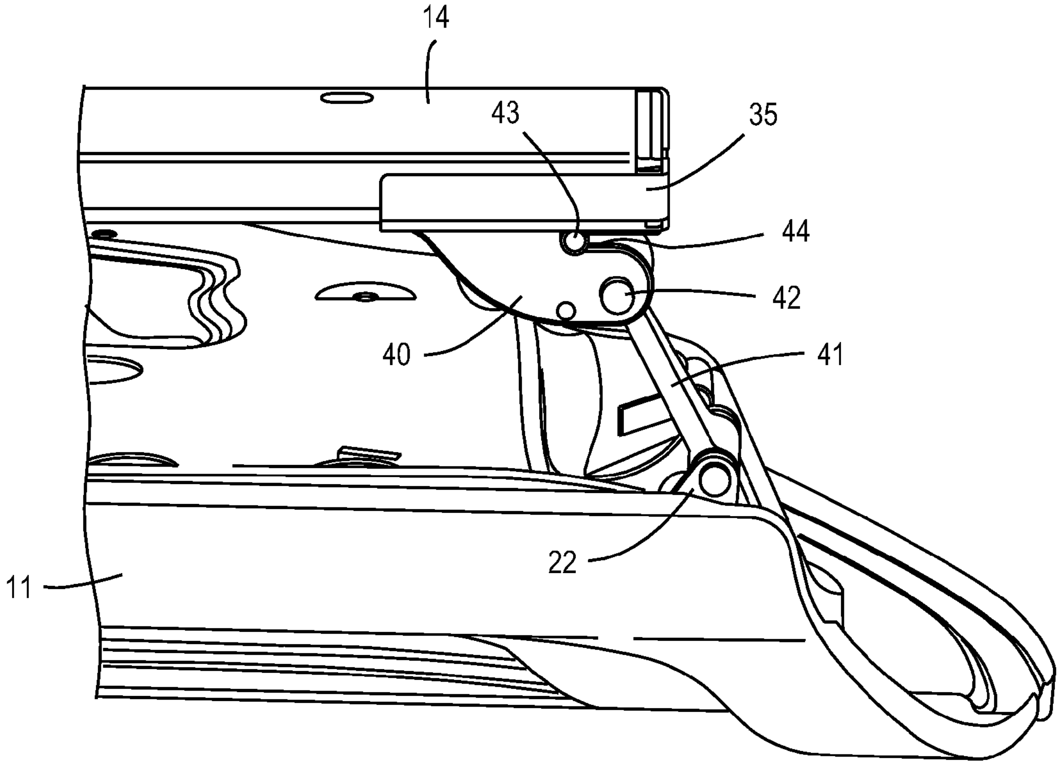
FIG. 13 is a top view showing the articulating arm of FIG. 12 after the roller bracket has reached the end of track.
Figure 14:
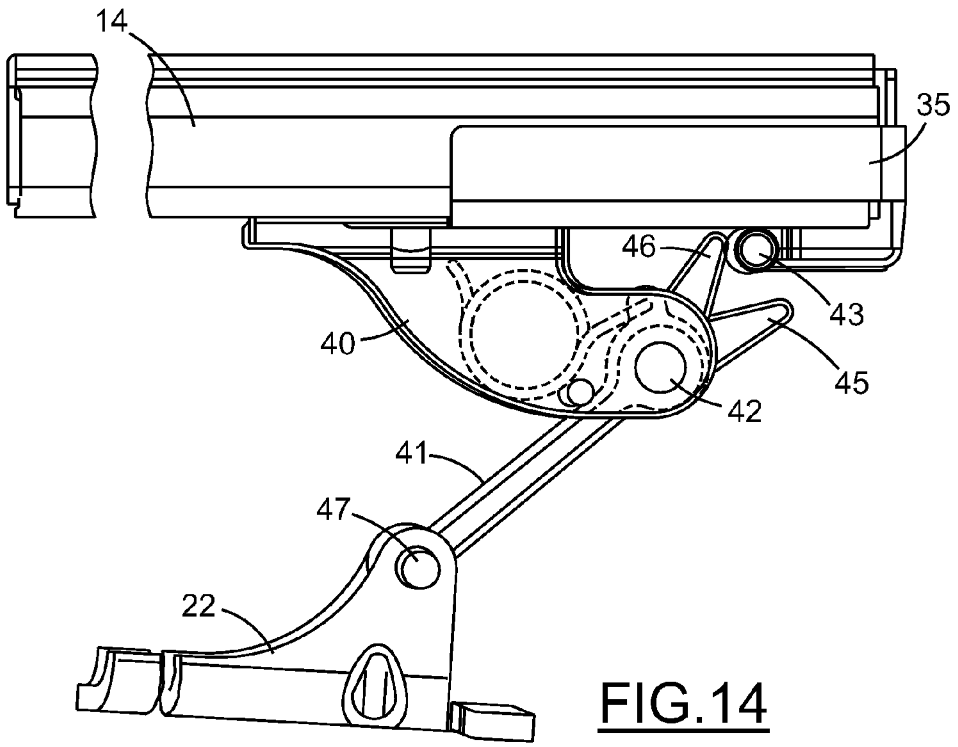
FIGS. 14 and 15 correspond to FIGS. 12 and 13 and show the actuation of the articulating arm in greater detail.
Figure 15:
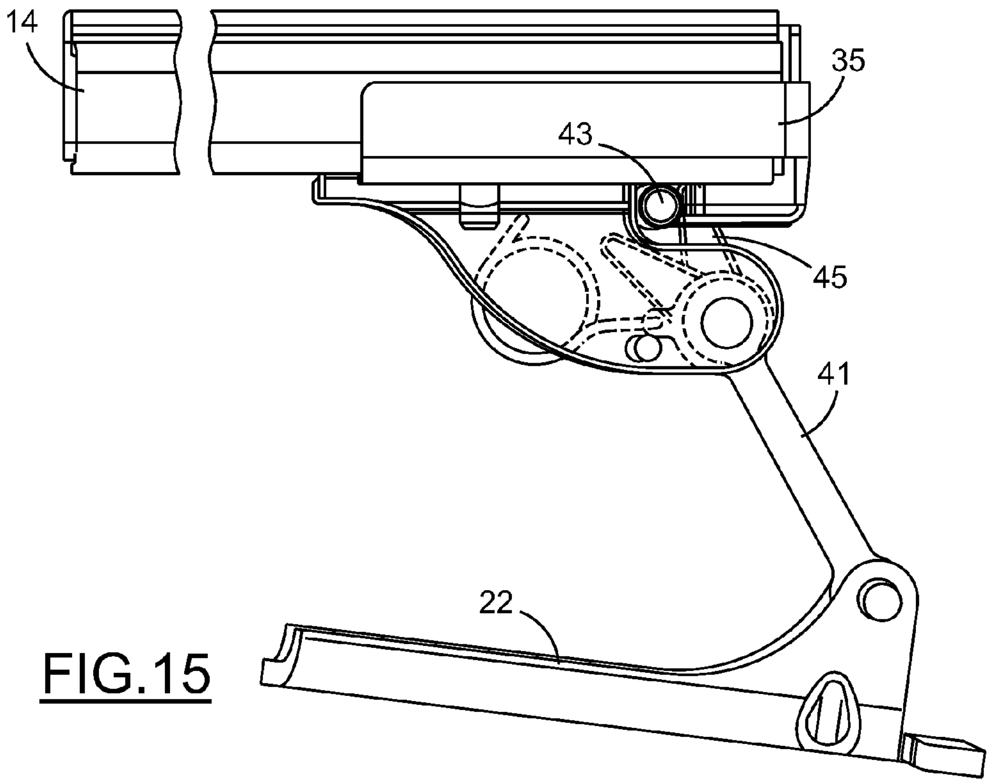

FIG. 12 shows an alternative embodiment providing mechanical assistance for reorienting the articulating arm as well as an integral mechanism for biasing the articulating arm to the desired position throughout the range of motion along the track. In FIG. 12, sliding door 11 is in its unextended position. A roller bracket 40 is coupled to door bracket 22 by an articulating arm 41 at a pivot point 42. Roller bracket 40 is shown in a position just before reaching the end of track 14 (i.e., arm 41 is in its first orientation), such that articulating arm 41 is about to engage a plunger or pin 43 which is fixed to end cap 35. FIG. 13 shows sliding door 11 in its extended position with articulating arm 41 having moved from its first orientation to its second orientation. Plunger 43 is received in a slot 44 of roller bracket 40 so that articulating arm 41 engages plunger 43 in a controlled manner. As shown in greater detail in FIG. 14, articulating arm 41 has first and second fingers 45 and 46 for receiving plunger 43 therebetween. As roller bracket 40 moves to the right in FIG. 14, plunger 43 contacts finger 46 so that articulating arm 41 pivots about a pivot pin 42 connecting it to roller bracket 40 and pivots about a pivot pin 47 connecting it to door bracket 22. Thus, articulating arm 41 moves from its first orientation as shown in FIG. 14 to a second orientation as shown in FIG. 15 with door bracket 22 extended beyond the end of track 14. In the second orientation, finger 45 rests against plunger 43. When the door is manually closed from this position, the action of finger 45 against plunger 43 toggles articulating arm 41 back into its first orientation.

Figure 16:
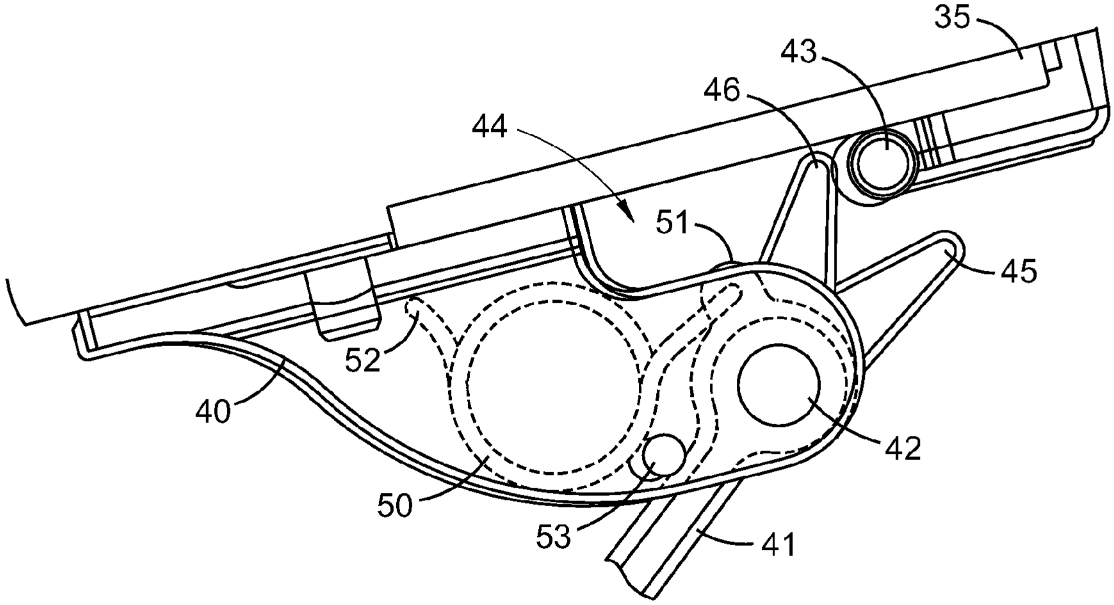
FIGS. 16 and 17 show the actuation of the over-center pin for biasing the articulating arm according to the second embodiment.
Figure 17:
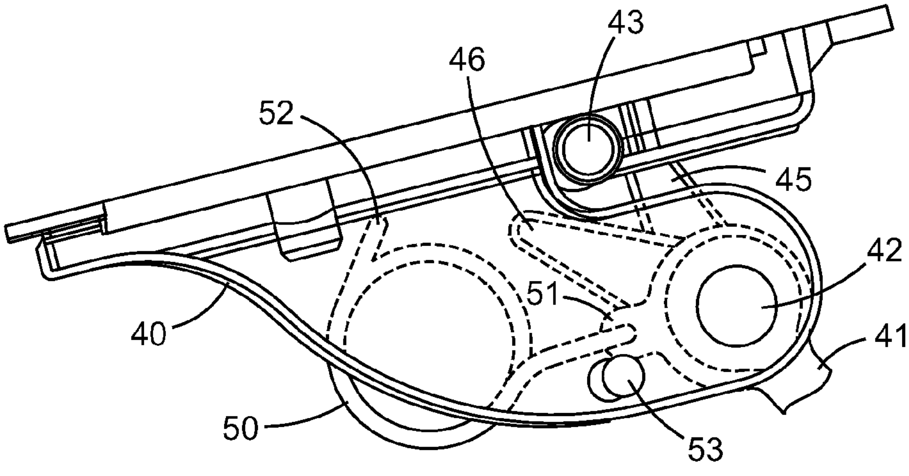

A preferred embodiment of a spring biasing mechanism for selectably maintaining articulating arm 41 in the first and second orientations is shown in FIGS. 16 and 17. An over-center spring 50 is joined to a tab 51 on articulating arm 41 and to an anchor point 52 on roller bracket 40. Over-center spring 50 is compressed between 51 and 52, so that a clockwise rotation moment is created for articulating arm 41. Thus, arm 41 is biased against a stop pin 53 mounted on roller bracket 40. The biasing of articulating arm 41 into the first orientation as shown in FIG. 16 is sufficiently strong to resist pivoting of articulating arm 41 as roller bracket 40 moves within track 14, even when there is a pulling force on the sliding door to open it. However, when finger 46 contacts plunger 43, the force of the closing action causes articulating arm 41 to pivot in a counter clockwise direction thereby further compressing over-center spring 50 as tab 41 moves clockwise around pivot pin 42. As tab 51 rotates, the direction of the spring force from over-center spring 50 moves to the opposite side of pivot pin 42. Then, over-spring 50 creates a rotation moment in the counter clockwise direction about pivot pin 42 to thereby maintain articulating arm 41 in the second orientation as shown in FIG. 17.

Figure 19:
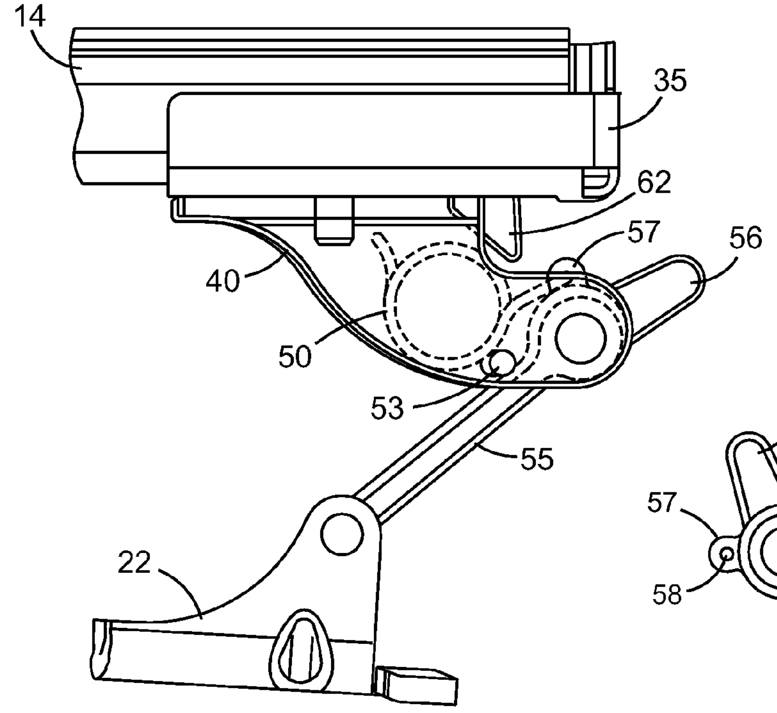
FIGS. 19 and 20 are top views showing the orientations of the articulating arm of FIG. 18.
Figure 18:
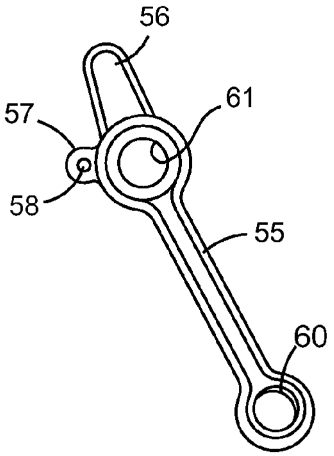
FIG. 18 is a plan view showing a third embodiment for the articulating arm.
Figure 20:
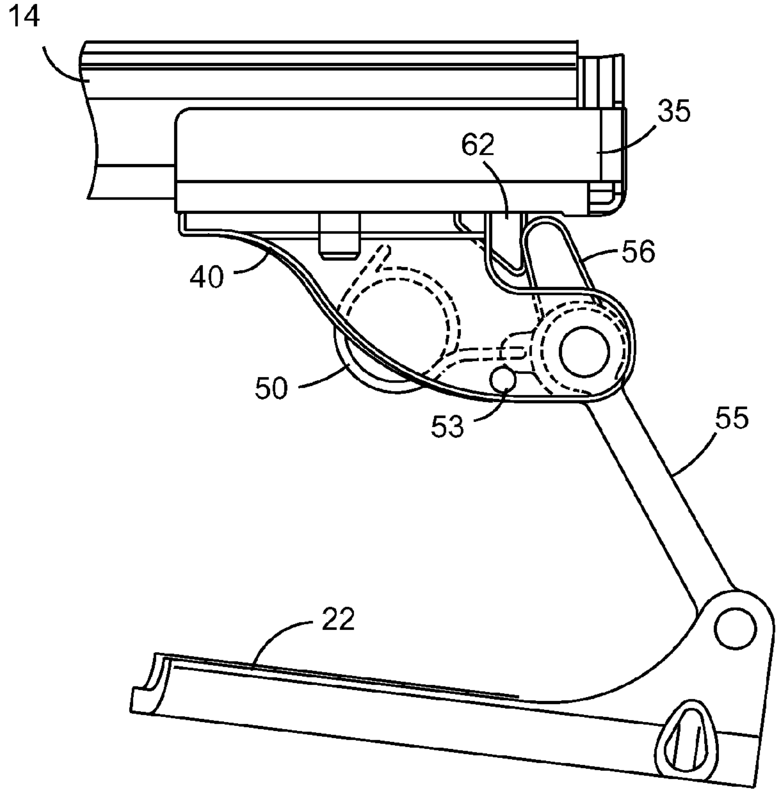
Figure 21:
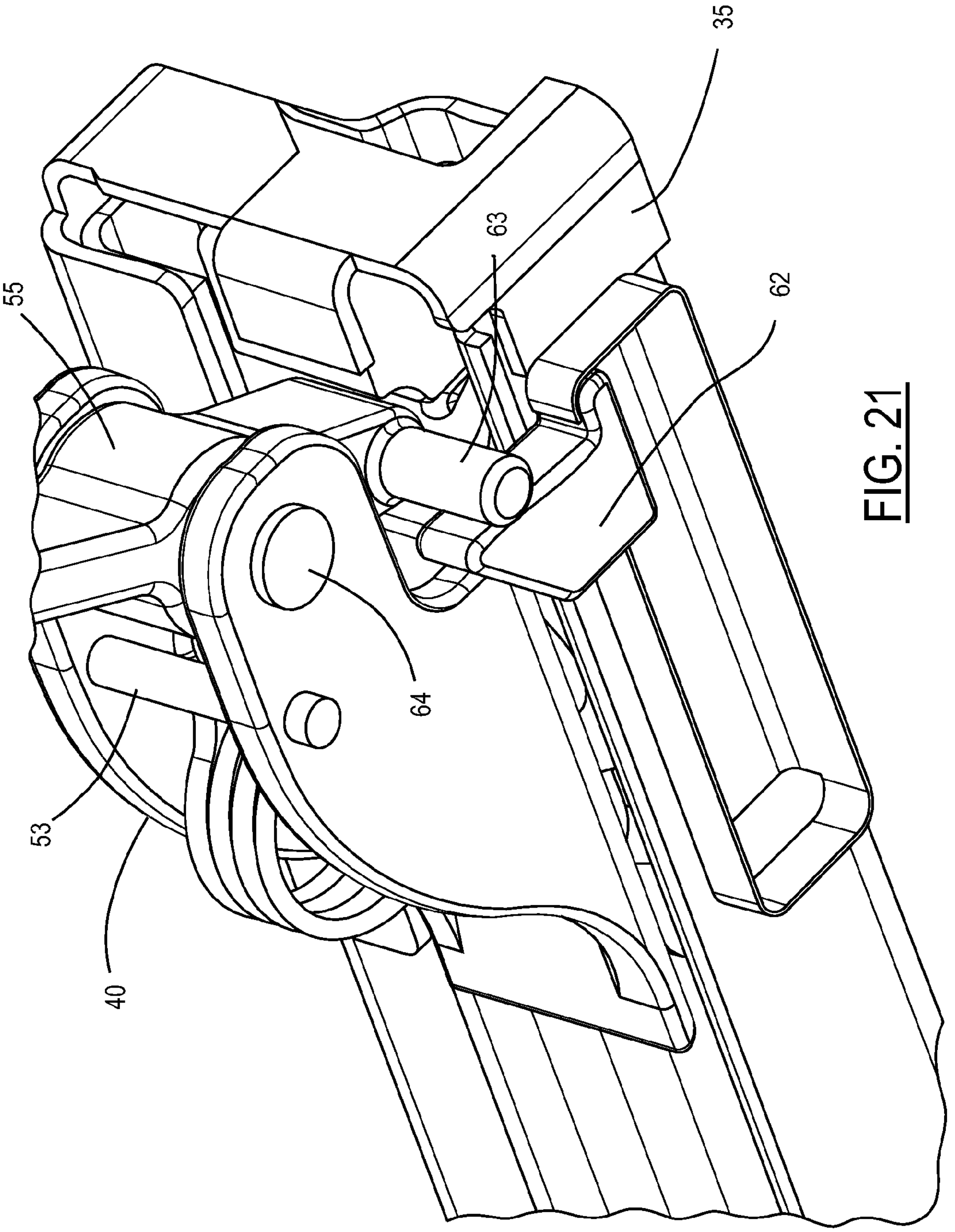
FIG. 21 is a bottom perspective view showing interaction between a reset pin on the articulating arm and a reset plunger.

Another embodiment of the articulating arm is shown in FIG. 18 wherein arm 55 has a single finger 56 and a tab 57 with a spring-receiving hole 58. Arm 55 also includes a pair of pivot holes 60 and 61 for receiving pivot pins as in the previous embodiments. As shown in FIGS. 19 and 20, finger 56 is used only for resetting articulating arm 55 from the second orientation back to the first orientation. In FIG. 19, roller bracket 40 has reached its end of travel. At that instant, inertia from the sliding of the door would overcome the biasing force of spring 51 so that articulating arm 55 moves out of the first orientation as shown in FIG. 19 to the second orientation as shown in FIG. 20 (and is held there by the spring bias from spring 50). In the second orientation, finger 56 abuts a reset plunger 62, which is fixed to the end of track 14 and may be integrally formed with end cap 35. As shown in FIG. 21, articulating arm 55 may have a projecting pin 63 for interacting with reset plunger 62. When roller bracket 40 begins to move to the left during the closing of the sliding door, reset plunger 62 forces pin 63 to pivot around the roller bracket pivot pin 64, thereby moving arm 55 toward its first orientation. Once the rotation moment of over-center spring 50 reverses, it biases arm 55 completely into its first orientation against stop pin 53.

Figure 22:
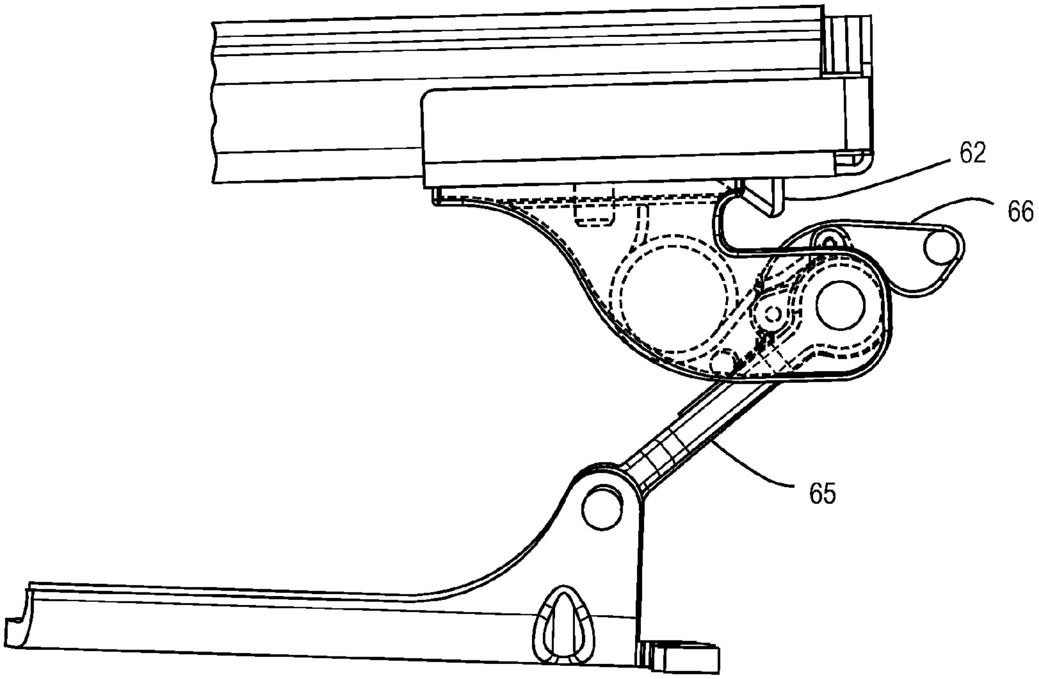
FIGS. 22 and 23 show yet another embodiment of the articulating arm in its first and second orientations, respectively.
Figure 23:
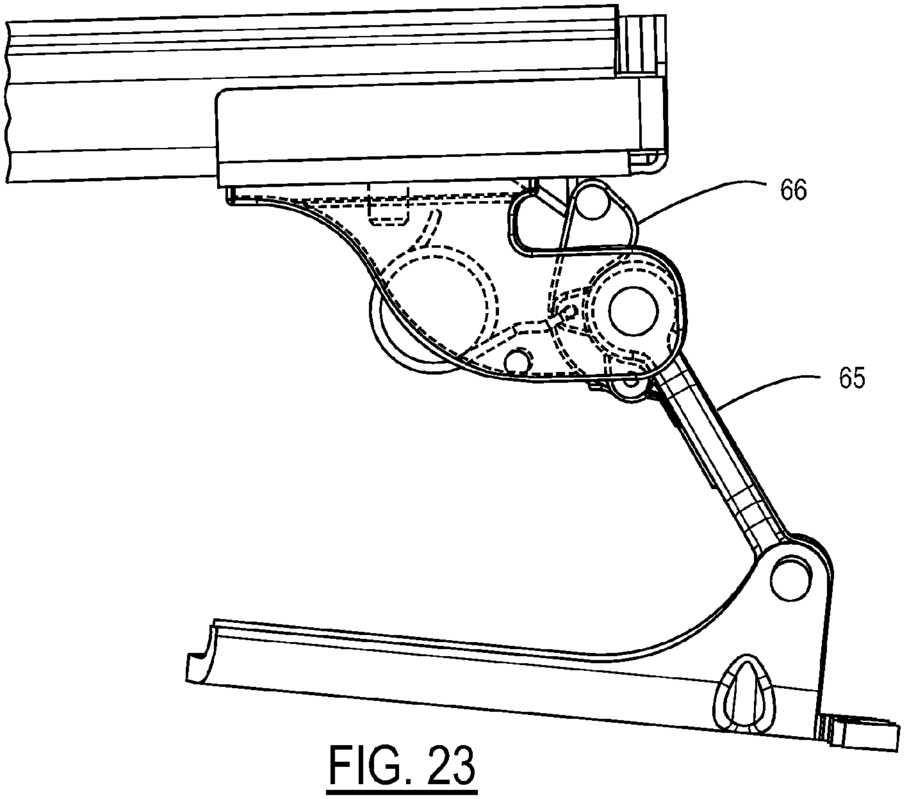

As shown in FIGS. 22 and 23, and articulating arm 65 may be used in an alternative embodiment having a separate reset lever 66 interfacing between reset plunger 62 and articulating arm 65.

In a typical embodiment of the invention, the articulating arm may rotate about 80° around the roller bracket pivot point. The resulting extension of the sliding door travel can be 80 mm or more.

While certain embodiments of the present invention have been described in detail, those familiar with the art to which this invention relates will recognize various alternative designs and embodiments for practicing the invention as defined by the following claims.

What is claimed is:

1. An apparatus for supporting a sliding door that moves between a closed position and a fully open position to selectively cover an opening in a vehicle, comprising:

a door bracket for fixedly mounting to the sliding door;

a track mounted along an exterior side of the vehicle and extending away from the opening to a remote end, the length of the track from the opening to the remote end being less than the distance traveled by the sliding door between the closed position and the fully open position; and a roller bracket having rollers received by the track and movable between a first position proximate the opening and a second position at the remote end of the track, wherein the roller bracket includes an articulating arm pivotally retained by the roller bracket at a first end of the articulating arm by a first pivot and pivotally retained at a second end by the door bracket, wherein the articulating arm has a first orientation for rotationally positioning the sliding door toward the closed position and a second orientation for rotationally positioning the sliding door away from the closed position and into the fully open position, wherein movement of the roller bearing into the second position results in the articulating arm moving from the first orientation to the second orientation; and wherein the roller bracket includes a spring biasing the articulating arm to the first orientation when the roller bracket is substantially not in the second position, and the spring biases the articulating arm to the second orientation when the roller bracket is substantially in the second position.

2. The apparatus of claim 1 wherein the roller bracket further comprises a stop for abutting the articulating arm when in the first orientation.

3. The apparatus of claim 1 wherein the spring is comprised of an over-center spring having a first end anchored to the roller bracket and a second end anchored to the articulating arm at a position relative to the first pivot such that the spring creates a first rotation moment with the articulating arm in the first orientation and creates a second rotation moment opposite the first rotation moment with the articulating arm in the second orientation.

4. The apparatus of claim 1 further comprising an end-of-travel plunger mounted to the track spaced from the remote end, wherein the plunger contacts the articulating arm when the roller bracket is moved away from the second position so that the articulating arm is switched from the second orientation to the first orientation by the plunger.

5. The apparatus of claim 4 wherein the articulating arm comprises of a pair of fingers for receiving the plunger, wherein the plunger contacts one of the fingers when the roller bracket is moved toward the second position so that the articulating arm is switched from the first orientation to the second orientation by the plunger.

6. The apparatus of claim 1 wherein the roller bracket includes a slot slidably receiving a plunger as the roller bracket moves into the second position.

7. A sliding door apparatus for a vehicle having a door opening with a forward edge and a rearward edge, comprising:

a sliding door selectively covering the door opening by moving between a closed position and a fully open position, the sliding door having a front edge and a back edge;

a door bracket for fixedly mounting to the sliding door near the back edge;

a track mounted along an exterior side of the vehicle and extending away from the opening to a remote end, the length of the track from the opening to the remote end being less than the distance traveled by the sliding door between the closed position and the fully open position; and a roller bracket having rollers received by the track and movable between a first position proximate the opening and a second position at the remote end of the track, wherein the roller bracket includes an articulating arm pivotally retained by the roller bracket at a first end of the articulating arm by a first pivot and pivotally retained at a second end by the door bracket, wherein the articulating arm has a first orientation for rotationally positioning the sliding door toward the closed position and a second orientation for rotationally positioning the sliding door away from the closed position and into the fully open position, wherein movement of the roller bearing into the second position results in the articulating arm moving from the first orientation to the second orientation; and wherein the roller bracket includes a spring biasing the articulating arm to the first orientation when the roller bracket is substantially not in the second position, and the spring biases the articulating arm to the second orientation when the roller bracket is substantially in the second position.

8. The apparatus of claim 7 wherein the roller bracket further comprises a stop for abutting the articulating arm when in the first orientation.

9. The apparatus of claim 7 wherein the spring is comprised of an over-center spring having a first end anchored to the roller bracket and a second end anchored to the articulating arm at a position relative to the first pivot such that the spring creates a first rotation moment with the articulating arm in the first orientation and creates a second rotation moment opposite the first rotation moment with the articulating arm in the second orientation.

10. The apparatus of claim 7 further comprising an end-of-travel plunger mounted to the track spaced from the remote end, wherein the plunger contacts the articulating arm when the roller bracket is moved away from the second position so that the articulating arm is switched from the second orientation to the first orientation by the plunger.

11. The apparatus of claim 10 wherein the articulating arm comprises of a pair of fingers for receiving the plunger, wherein the plunger contacts one of the fingers when the roller bracket is moved toward the second position so that the articulating arm is switched from the first orientation to the second orientation by the plunger.

12. The apparatus of claim 7 wherein the roller bracket includes a slot slidably receiving a plunger as the roller bracket moves into the second position.

13. A method of extending travel of a vehicle sliding door beyond the end of a roller track traversed by a roller bracket for supporting the sliding door during opening, wherein a door bracket is mounted proximate to an edge of the sliding door, the method comprising the steps of:

interconnecting the roller bracket and the door bracket via an articulating arm pivotally retained by the roller bracket at a first end of the articulating arm by a first pivot and pivotally retained at a second end by the door bracket, wherein the articulating arm has a first orientation for rotationally positioning the sliding door toward the closed position and a second orientation for rotationally positioning the sliding door away from the closed position and into the fully open position;

biasing the articulating arm to the first orientation when the sliding door is in the closed position;

initiating the opening of the sliding door and continuing to bias the articulating arm to the first orientation as the roller bracket moves toward the end of the roller track;

overcoming the bias of the articulating arm into the first orientation when the roller bracket reaches the end of the roller track so that the articulating arm moves from the first orientation to the second orientation;

biasing the articulating arm into the second orientation while the roller bracket remains at the end of the roller track;

manually pulling the sliding door to overcome the bias; and re-biasing the articulating arm into the first orientation as the roller bracket leaves the end of the roller track.

* * * * *